United States Patent Office 3,321,992
Patented May 30, 1967

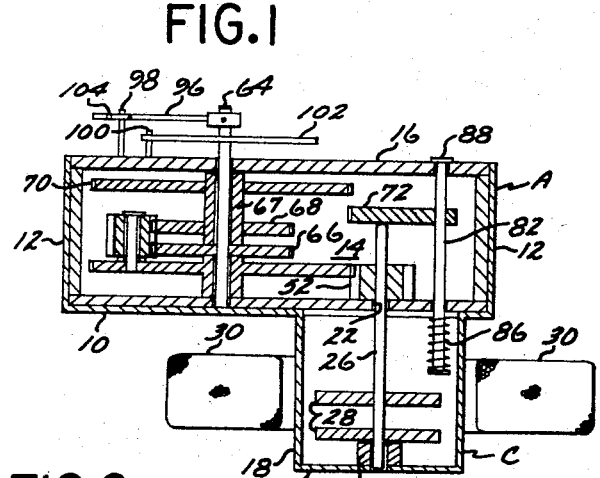

3,321,992
CLUTCH MOTOR
Toshio Kawada, 4–6 Miyashita-cho, Sakaideshi,
Kagawaken, Japan
Filed June 21, 1965, Ser. No. 465,526
7 Claims. (Cl. 74—472)

The present invention relates generally to electromechanical devices, and more particularly to a clutch motor for use in timers, and the like, as well as in intermittently rotating a driven shaft from a first to a second position, and then automatically returning the driven shaft to the first position from which the operation is thereafter repeated.

A primary object of the present invention is to provide a clutch motor of simple mechanical structure that can be fabricated from standard commercially available materials, and requires no elaborate plant facilities for the production thereof, whereby it may be retailed at a sufficiently low price as to encourage the widespread use thereof.

Another object of the invention is to supply a clutch motor that requires little or no maintenance attention and one in which the gears are subjected to a minimum of wear inasmuch as they do not engage or disengage while in motion.

A still further object of the invention is to furnish a clutch motor which is particularly adapted for use in timing devices and the control of automatic equipment.

Yet another object of the invention is to provide a clutch motor that is compact, in which a minimum of backlash occurs in the gears, and that provides a greater reduction between the driving the driven shafts than attainable with mechanisms of this nature available heretofore.

Still a further object of the invention is to furnish a clutch motor in which an arm that is intermittently moved from a first to a second position is immediately returned to the first position upon interruption of electrical current to the motor.

These and other objects and advantages of the present invention will become apparent from the following description of a preferred and alternate forms thereof when taken in conjunction with the accompanying drawing illustrating the same, in which:

FIGURE 1 is a longitudinal cross-sectional view of the clutch motor in a first position;

FIGURE 2 is the same view as shown in FIGURE 1, but with the clutch motor in a second position;

FIGURE 3 is a fragmentary, longitudinal cross-sectional view of an alternate form of the motor;

FIGURE 4 is a top plan view of a portion of the device shown in FIGURE 1, taken on the line 4—4 thereof;

FIGURE 5 is a top plan view of the motor shown in FIGURE 1, taken on the line 5—5 thereof wherein a rotatable arm thereof is in a first position; and FIGURE 6 is the same view as shown in FIGURE 5, but with said arm being in a second position.

With continued reference to the drawing for the general arrangement of the invention, it will be seen to include a housing A provided with a bottom 10, two end walls 12, two side walls 14, and a cover 16. The cover 16 is removably held in position on the upper portions of end walls 12 and side walls 14 by conventional fastening means (not shown). The housing A also includes an outwardly projecting extension C that is defined by side walls and end walls, generally identified by the numeral 18, and a bearing plate 20 which is parallel to the bottom 10.

A bore 22 is formed in the bottom 10 that is in alignment with a bearing 23 mounted on plate 20. A driving shaft 26 is rotatably supported by bore 22 and a bearing 23 whereby the shaft can slide longitudinally relative thereto within predetermined limits, later to be described. A rotor 28 of an electric motor B is rigidly affixed to the driving shaft 26.

The motor B also includes stators windings 30 which are supported by conventional means (not shown) in a fixed position relative to extension C. Motor B is preferably of the repulsion type. One terminal of motor B is connected by a conductor 32 to a source of domestic power 34. The other terminal of motor B is connected by a conductor 36 to a contact 38 of an electric switch 40.

A blade 42 associated with switch 40 is at all times urged to engage the contact 38 by a compressed spring 44. The blade 42 is connected by a conductor 43 to a single pole, single throw switch 45 that includes a blade 46 and contact 48 connected by a conductor 50 to a source of domestic power 34, as can best be seen in FIGURE 6. When the electric motor B is energized, the rotor 28 and driving shaft 26 are moved upwardly from the first position shown in FIGURE 1 to the second position shown in FIGURE 2 by the magnetic force in the stator windings 30. The rotor 28 is rotated when in the second position, as is conventional with such repulsion type motors.

A spur gears 52 of substantial width is mounted on driving shaft 26, and this spur gear rotates a central gear 54 from the outer circumferential portion of which a shaft 56 projects upwardly. The driving shaft 56 rotatably supports a planetary gear 58. Aligned bores 60 and 62 are formed in the bottom 10 and cover 16 respectively, and serve to rotatably support a driven shaft 64, which projects upwardly above the cover 16 a substantial distance, as best seen in FIGURES 1 and 2.

A reduction gear 66 is rigidly affixed to the driven shaft 64, situated directly above the central gear 54. Also, a sleeve 67 is rotatably mounted on shaft 64 (FIGURES 1 and 2), and a clutch gear 68 is affixed to this sleeve that engages the planetary gear 58. The upper portion of sleeve 67 supports a control gear 70 that is of substantially the same diameter as that of the central gear 54.

An elongate, horizontally disposed locking member 72 is provided, as shown in FIGURES 2 and 4, on a first end of which teeth 74 are formed that are adapted to mesh with teeth 76 of the control gear 70. Two aligned bores 78 and 80 are formed in the bottom 10 and cover 16, respectively, and serve to slidably support a rod 82, on the lower end of which a head 84 is formed. A compressed helical spring 86 encircles rod 82, and bears against the head 84 and the under surface of bottom 10 in the manner illustrated in FIGURE 1. The upper end of rod 82 is provided with an enlarged portion 88 which prevents displacement of the rod from bore 80 due to the action of spring 86. The rod 82 is of square transverse cross section, as are the bores 78 and 80 that sildably support the same.

A bore 90 is formed in locking member 72 (FIGURE 4) through which the rod 82 extends, with the rod being rigidly secured to the locking member by conventional means (not shown) such as welding, or the like. The under surface of member 72 is at all times maintained in contact with the upper end of the driving shaft 26, as shown in FIGURES 1 and 2, by spring 86. The compression on spring 86 at all times tends to force the locking member 72 towards the bottom 10 and also tends to move the driving shaft 26, rotor 28 and spur gear 52 into the first position shown in FIGURE 1.

When the stator 30 of the motor B is energized, the rotor 28 and driving shaft 26 are moved upwardly from the first position into the second position shown in FIGURE 2, and as they move into this second position they further compress spring 86 and place the locking member 72 in engagement with the teeth 76 (FIGURE 2).

A collar 92 is affixed to the upper end of the driven shaft 64 by a set screw 94, and an arm 96 extends outwardly from this collar which is parallel to the cover 16. An upright 98 is supported on cover 16 which serves as a stop to limit clockwise rotation of arm 96. A second upright 100 projects upwardly from cover 16, to which one end of a tensioned helical spring 102 is affixed, with the other end of this spring being secured to the upper portion of the driven shaft 64 by conventional means (not shown).

A pin 104 projects from the outer end portion of arm 96 (FIGURE 5), and when this pin engages the blade 42 of switch 40 the electrical circuit to the motor B is interrupted. Upon interruption of the electrical circuit to motor B, the stator 30 no longer generates a magnetic force to hold the rotor 28 in the second position (FIGURE 2), and the rotor, driving shaft 26 and spur gear 52 move from the second position to the first position shown in FIGURE 1, due to a force provided by spring 86.

The sleeve 67, together with clutch gear 68 and control gear 70, are free to rotate on driven shaft 64 when the locking member 72 is in the first position shown in FIGURE 1. The free rotation of sleeve 67 and gears 68 and 70 permits the planetary gear 58 to rotate. Such rotation of the planetary gear 58 is necessary to permit reduction gear 66 and driven shaft 64 to be rotated by spring 102 to return the arm 96 from the second position shown in FIGURE 6 to the first position illustrated in FIGURE 5.

When the arm 96 moves from a second location shown in FIGURE 6, to a first location illustrated in FIGURE 5, spring 44 moves blade 42 into engagement with contact 38. The rotor 28 and driving shaft 26, due to the inertia thereof, as well as the compressive force exerted by the spring 86 on locking member 72, take an appreciable length of time in which to move from the second position shown in FIGURE 2 to the first position illustrated in FIGURE 1. Spring 102 is under sufficient tension that it returns the arm 96 from the second location shown in FIGURE 6 to the first location illustrated in FIGURE 5 during the period of time it takes the rotor 28 and driving shaft 26 to move from the second to the first position illustrated in FIGURE 1 and 2.

Thus, after the switch 45 is closed, the arm 96 will pivot from the first to the second location shown in FIGURES 5 and 6, due to the rotation of the driven shaft 64 in a counter clockwise direction until switch 40 is opened, and the arm thereafter returns in a clockwise direction to the first location from which the operation is repeated. The switch 45 may be the main switch in a timer (not shown) that utilizes the device above described.

An alternate form of the invention shown in FIGURE 3 is comprised of a number of the elements found in the preferred form thereof, and these elements are designated herein by the same identifying numerals used with the preferred form, but to which a prime has been added. In this alternate form the rod 82' has two horizontal, vertically disposed pins 106 projecting outwardly therefrom that slidably engage a lever 108 which is so transversely aligned in the housing A' that the left-hand end of the lever (FIGURE 3) at all times engages the upper end of the driving shaft 26'. An eye 110 is formed in the right-hand end of lever 108 that pivotally engages a pin 112 supported on the upper end of an upright 114 fastened by conventional means to the upper surface of the bottom 10'.

A tensioned helical spring 116 is connected to the lever 108, as shown in FIGURE 3, with the lower end of the spring being affixed to the upper surface of the bottom 10' by conventional means. The spring 116 at all times tends to urge the lever 108 to pivot in a counter clockwise direction and the maintain the driving shaft 26' and the locking member 72' in the first position previously described and illustrated in FIGURE 1. It is only when the alternate form of the device is electrically energized that the driving shaft 26' and spur gear 52' occupy the position shown in FIGURE 3.

The use and operation of the two forms of the invention are relatively simple. The switch 45 is closed manually to electrically energize the stator 30 whereby the magnetic field generated as a result thereof causes upward movement of the rotor 28 and driving shaft 26 from the first position (FIGURE 1) to the second position (FIGURE 2). Rotation of shaft 26 and rotor 28 drives the spur gear 52, which in turn rotates the central gear 54.

As the driving shaft 26 moves from the second to the first position, it moves the locking member 72 upwardly into engagement with the teeth 76 of control gear 70, whereby sleeve 67 and clutch gear 68 are thereafter held in a stationary position relative to housing A. As the central gear 54 is rotated by the spur gear 52, the planetary gear 58 revolves about the clutch gear 68, and in so doing, rotates the reduction gear 66 and driven shaft 64. Shaft 64 rotates in a counter clockwise direction (FIGURES 5 and 6) and moves the arm 96 from the first location shown in FIGURE 5 towards the second location illustrated in FIGURE 6.

When arm 96 reaches said second location, the pin 104 moves the blade 42 out of engagement with the contact 38, whereby the electrical circuit to the stator 30 is broken. Thereafter, the magnetic field holding the rotor 28 in the second position (FIGURE 2) is terminated, which permits the compressed helical spring 86 to move the locking member 72 downwardly out of engagement with the teeth 76. The control gear 70, sleeve 67 and clutch gear 68 are then free to rotate on the driving shaft 64.

Due to the tension on the helical spring 102, it now rotates the driven shaft 64 to return the arm 96 from the second location shown in FIGURE 6 to the first location illustrated in FIGURE 5. When the pin 104 moves away from the blade 42 of switch 40, the spring 44 urges the blade 42 into engagement with the contact 38 to reestablish the electrical circuit to the stator 30. Upon energization of stator 30, the rotor 28 and driving shaft 26 start to move upwardly from the second position shown in FIGURE 2 to the first position illustrated in FIGURE 1. However, this movement is opposed by the compressed spring 86 as well as the inertia of the rotor 28 and driving shaft 26, and this opposition gives the arm 96 sufficient time to move from the second location shown in FIGURE 6 to that illustrated in FIGURE 5 before the shaft 26 moves the locking member 72 upwardly to the extent that it engages the teeth 76 of control gear 70.

After the arm 96 has returned to the first position shown in FIGURE 5, the operation just described is repeated.

The reduction gear 66 and the clutch gear 68 in both the preferred and alternate forms of the invention are preferably provided with a different number of teeth. For example, if the teeth on reduction gear 66 are N in number, the number of teeth on clutch gear 68 will be N+1, or other integer.

Although the present invention is fully capable of achieving the objects and providing the advantages hereinbefore mentioned, it is to be understood that it is merely illustrative of the presently preferred embodiments thereof, and I do not mean to be limited to the details of construction herein shown and described, other than as defined in the appended claims.

I claim:

1. A clutch motor, comprising:
    (a) a driving shaft;

(b) a housing that rotatably and slidably supports said driving shaft;

(c) electrical means for moving said driving shaft from a first to a second position in said housing and rotating said driving shaft when in said second position;

(d) a driven shaft rotatably supported in said housing;

(e) a reduction gear mounted on said driven shaft and disposed in said housing;

(f) a spur gear mounted on said driving shaft and disposed in said housing;

(g) gear means situated in said housing, which gear means is in engagement with said reduction gear for rotating said driven shaft and reduction gear in a first direction effected by rotary motion of said spur gear;

(h) an arm extending outwardly from said driven shaft;

(i) first spring means that at all times tends to rotate said driven shaft in a second direction opposite to said first direction;

(j) a stop against which said arm rests when said arm is in a first location;

(k) a circuit for supplying electric current to said electrical means;

(l) a normally closed spring-loaded switch forming a part of said circuit, which switch is momentarily opened when said arm moves from said first location to a second location; and (m) second spring means for moving said driving shaft and spur gear from said second to said first position when said circuit is momentarily interrupted when said normally closed switch is opened by said arm, with said first spring means rotating said driving shaft and arm from said second to said first position prior to movement of said driving shaft from said first to said second position, with said electrical means again rotating said driving shaft to move said driven shaft and arm in said first direction upon return of said arm to said first position.

2. A clutch motor as defined in claim 1 wherein said electrical means comprises:

(n) a rotor affixed to said driving shaft; and (o) a stator disposed in a fixed position relative to said housing and encircling said rotor when said driving shaft is in said first position.

3. A clutch motor as defined in claim 1 wherein said gear means comprises:

(n) a central gear in engagement with said spur gear and rotatably mounted on said driven gear;

(o) a planetary gear rotatably supported on an outer circumferential portion of said central gear, with said planetary gear at all times being in engagement with said reduction gear; and (p) a gear assembly including a sleeve, a clutch gear affixed to said sleeve, and a control gear rigidly connected to said sleeve, with said sleeve being rotatably mounted on said driven shaft, and said clutch gear at all times in engagement with said planetary gear.

4. A clutch motor as defined in claim 3, wherein said clutch gear has a greater number of teeth than said reduction gear.

5. A clutch motor as defined in claim 3, wherein said second spring means includes:

(n) a rod slidably supported in said housing parallel to said driving shaft;

(o) a spring that at all times tends to move said rod in a direction towards said rotor; and (p) a toothed locking member rigidly affixed to said rod and at all times held in contact with a first end of said driving shaft, with said spring at all times tending to move said driving shaft and rotor from said second position into said first position, and when said driving shaft and rotor are moved to said second position, said locking member is moved into engagement with said control gear to prevent rotation of said sleeve and clutch gear.

6. A clutch motor as defined in claim 3 wherein said second spring means includes:

(n) a rod slidably supported in said housing parallel to said driving shaft;

(o) two parallel, longitudinally spaced pins which project outwardly from said rod;

(p) a lever extending between said two pins, with a first end portion of said lever being in alignment with an upper end of said driving shaft;

(q) an upright that pivotally supports a second end portion of said lever;

(r) a tensioned spring that at all times tends to move said lever in a direction which causes said lever to place said driving shaft in said first position; and (s) a toothed locking member mounted on said rod, which member is in engagement with said control gear and prevents rotation thereof when said driving gear is in said second position.

7. A clutch motor as defined in claim 3 wherein said first spring means comprises a tensioned helical spring, one end of which is connected to said driven shaft, with the opposite of said spring being connected to said stop.

References Cited

UNITED STATES PATENTS

| | | | |
|---|---|---|---|
| 2,757,550 | 8/1956 | Weinfurt | 74—472 |
| 3,168,840 | 2/1965 | Williams | 74—472 |
| 3,245,284 | 5/1966 | Leslie | 74—472 |

ROBERT M. WALKER, *Primary Examiner.*

H. S. LAYTON, *Assistant Examiner.*